United States Patent

[11] 3,584,845

[72] Inventor Alfred E. Hoffman
 Saddle River, N.J.
[21] Appl. No. 791,337
[22] Filed Jan. 15, 1969
[45] Patented June 15, 1971
[73] Assignee Universal Oil Products Co.
 Des Plaines, Ill.

[54] AIR SPRING
 7 Claims, 2 Drawing Figs.
[52] U.S. Cl. .................................................... 267/120
[51] Int. Cl. ...................................................... F16f 5/00
[50] Field of Search ........................................... 267/152,
 153, 151, 63, 35

[56] References Cited
UNITED STATES PATENTS
3,070,363 12/1962 Ellis, Jr. ......................... 267/35
3,160,407 12/1964 Vaugoyeau ................... 267/35

*Primary Examiner*—James B. Marbert
*Attorneys*—James R. Hoatson, Jr. and Phillip T. Liggett

ABSTRACT: In a rubber-walled air spring suitable for use in a vehicle spring suspension system, the improvement comprising a cellulose sponge, mesh, or other ozone-accepting structure positioned within the air spring or in a connection line between the air spring and an air supply source. The cellulose rapidly reacts with any ozone in the air transmitted to the air spring, whereby interior chemical deterioration of the rubber wall of the air spring is suppressed.

PATENTED JUN 15 1971

3,584,845

INVENTOR:
Alfred E. Hoffman

BY: James R. Hoolson, Jr.
Philip T. Liggett
ATTORNEYS

AIR SPRING

This invention relates to a rubber-walled air spring suitable for use in a vehicle spring suspension system. More particularly, this invention is the improvement comprising a cellulose structure, such as a sponge or mesh, positioned within the air spring or in a connection line between the air spring and an air supply source.

A rubber-walled air spring, as employed in the suspension system of a vehicle is either of circular or annular cross section. The air spring normally is constructed with cylindrical outer walls, which bulge out when in use under a load, thereby assuming the peripheral shape of a small motor vehicle tire. The air spring completely encloses an air space and the gas within the space acts as a cushion to forces applied upon either the top or the bottom of the air spring. Air springs, as employed in cushioning the load in a vehicle such as a truck or bus, are positioned at various locations on the vehicle frame or chassis to cushion the load as well as the body portion of the vehicle with respect to the chassis. The air springs are horizontally positioned so that the cylindrical outer surfaces of the air springs are substantially vertical and bulge outward when loaded.

Each air spring is often connected or connectable to an air supply, either by a connection line to an outside air supply, or to an air compressor or compressed air storage containers mounted on the vehicle. In any case, the air pressure within the air spring is changed in accordance with the load carried by the air spring so that from time to time a new quantity of air is introduced into the air spring. This may be either on a continuous basis, such as where a compressed air supply is mounted on the vehicle, or periodically, such as in common where the air pressure in the air springs is adjusted at service stations or dispatch centers.

Air springs are generally constructed with an outer layer comprised in whole or in part of neoprene or styrene butadiene rubber. This outer layer is normally reinforced by nylon or other strong fabric. The inner surface of the air spring is normally comprised of a neoprene blend of rubber. Generally, the neoprene blend forming the inner liner of the air springs contains antiozonants which often are quite adequate to prevent the deterioration of the inner liner of the air springs from contaminants transmitted by the air supply. In many other cases, especially with heavy duty vehicles, the quantity of ozone transmitted to the air spring may be too great to be reacted with or adsorbed by the conventional antiozonants present in the air spring liner. One instance where an especially large quantity of ozone is present is where the intake of the air compressor connected to the air spring is located near the vehicle exhaust system or engine breather system. Here, the compressor will pump disproportionate amounts of engine exhaust gases to the air springs. These engine exhaust gases contain substantial quantities of ozone and other gases, such as nitrogen oxides, which act upon and deteriorate the air spring liner. Another instance where quantities of ozone find a way to the air spring is where the compressed air supplied to the air springs, either in containers or from an outside supply, is pumped at an automotive service center. Engine exhaust gases and other fumes are abundantly present in such servicing locations and disproportionately large quantities of ozone and nitrogen oxides are collected in the compressed air and transmitted to the air springs. In these and other cases, it has been found that some of the air springs have prematurely failed because of cracking of the inner neoprene liner even though the normal resistance of neoprene to ozone attack has been augmented by the addition of antiozonants which are conventionally used in the construction of air springs.

It is an object of this invention to prevent such failures from occuring by preventing the attack of ozone upon the inner liner of an air spring.

It is a further object to institute this protection in a form which can be incorporated into the air spring either at the time of manufacture of the air spring or long after manufacture has been completed.

In board aspect, this invention is, in a rubber-walled air spring suitable for use in a vehicle suspension system, the improvement comprising a means for accepting ozone from the gas enclosed in the aforesaid air spring, whereby interior chemical deterioration of the air spring is suppressed.

One means for implementing this invention is by utilizing cellulose mesh, cellulose sponge, cotton waste, or any other avid acceptor of ozone or nitrogen oxides, such as phenyl naphthalene.

ONe preferred embodiment of this invention is, in a rubber-walled air spring suitable for use in a vehicle suspension system, the improvement comprising a cellulose-containing material enclosed by the air spring. In one form of this embodiment the cellulose-containing material is a cellulose mesh positioned around the inner wall of the air spring. In an alternative form the cellulose-containing material is a cellulose sponge positioned within the air spring.

Another preferred embodiment of this invention is, in a rubber-walled air spring connected by a connection line to an air supply and suitable for use in a vehicle suspension system, the improvement comprising a cellulose-containing material positioned in the aforesaid connection line. As in the other preferred embodiment, the cellulose-containing material may be a cellulose mesh, a cellulose sponge, or some other cellulose-containing structure. In any form of the invention, the cellulose or other material can be expected to react with the ozone transmitted to the air spring so rapidly that little if any ozone will be left available to attack the neoprene air spring liner.

The various features of this invention are more clearly illustrated in the accompanying drawings in which.

Figure 1:
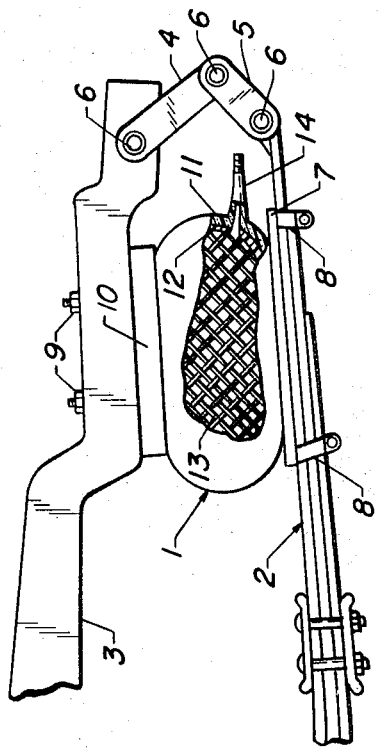
FIG. 1 is a partially cutaway view of the improved air spring of this invention as used on a vehicle.

Referring now to FIG. 1, there is shown in a view from the side of a vehicle, an air spring 1 mounted between a leaf spring 2 and a vehicle frame member 3. Leaf spring 2 and vehicle frame member 3 are joined together at a connection comprised of link members 4 and 5. A duplicate connection (not shown) exists at the other end of leaf spring 2 and vehicle frame member 3. Link member 4 is joined to link member 5, and link member 5 to leaf spring 2 and link member 4 to frame member 3 by bolt assemblies 6. The load of the vehicle body and the cargo carried bears down upon frame member 3 while a wheel of the vehicle is attached to leaf spring 2 through an axle at the center portion of leaf spring 2 (not shown). Thus, air spring 1 acts as a cushion for shocks and jolts transmitted by the wheel through leaf spring 2 as well as a cushion for fluctuations in load which are caused by the pitching of the vehicle body during travel. A steel bearing plate 7 is secured to leaf spring 2 by metal flanges 8 which extend downward from bearing plate 7 on either side of leaf spring 2. The metal flanges are bolted together, thus rendering bearing plate 7 immobile with respect to leaf spring 2. Bearing plate 7 is shaped in the form of a disc so as to contact the entire underside of air spring 1, which is fastened by adhesive at its center to the center of bearing plate 7. A bearing plate 10 with a shape similar to that of bearing plate 7 is positioned directly above air spring 1 on the underside of frame member 3 and is fastened to frame member 3 by bolt assemblies 9 which extend through bearing plate 10 and frame member 3. The air spring 1 is comprised of an outer layer 11 of a styrene butadiene rubber reinforced by nylon cords. Outer layer 11 is bonded to an inner liner 12 of neoprene throughout the entire surface of contact of outer layer 11 with inner liner 12. Bonded by adhesive to the inner liner 12 is a cellulose mesh 13, which is incorporated into air spring 1 for the purpose of attracting ozone which would otherwise attack the neoprene inner liner 12. Air spring 1 is equipped with a valve 14, through which air can be pumped from an outside source.

In operation, air is forced into or released from air spring 1 through valve 14 until the proper riding pressure to accommodate the load on the vehicle exists within air spring 1. The pressure is normally adjusted when the vehicle is initially loaded or unloaded. In addition, at various times it may be desirable to increase or decrease the pressure in air spring 1 depending upon the driving surface over which the vehicle travels. Adjustment of air pressure in air spring 1 is accomplished in the initial as well as subsequent instances by connecting an airhose from an automotive service station to valve 14. As air is forced into air spring 1 through valve 14, the ozone in the air is attracted to and combines with the cellulose mesh inside air spring 1. Since the ozone is attracted to the cellulose mesh 13, the neoprene liner 12 is left unharmed and hence does not show a tendency to deteriorate.

Figure 2:
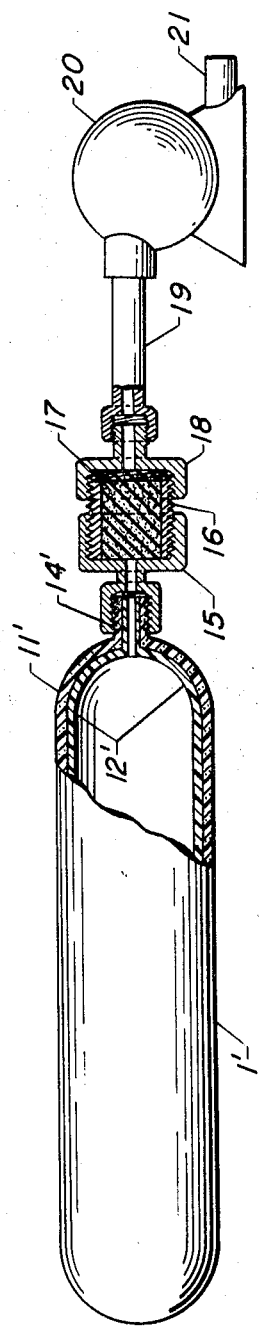
FIG. 2 is a partially cutaway view of an isolated alternative embodiment of this invention.

FIG. 2 illustrates a slightly different version of this invention in FIG. 2, an air spring 1' is comprised of an outer layer 11' of a nylon reinforced neoprene combination, an inner liner 12' of a neoprene blend, and a valve 14'. Air is introduced to and expelled from air spring 1' through valve 14'. A connection member 15 is screwed on to valve 14', and as illustrated, terminates in a larger section into which is screwed a cylinder 16. Cylinder 16 is filled with cellulose sponge 17. A cap 18 is screwed on to cylinder 16 thereby forming a guard chamber in which air must pass through cellulose sponge 17 before reaching air spring 1'. An airhose 19 is connected to cap 18 at one end and to a compressor 20 at its other end. The compressor 20 is normally operated by the vehicle engine and takes in air through a port 21. In an air spring utilizing this embodiment of the invention, the ozone taken in through port 21 of compressor 20 must pass through airhose 19, cap 18, and cellulose sponge 17 before entering air spring 1' through connection member 15 and valve 14'. All of the ozone is thereby reacted with cellulose sponge 17, thus eliminating any ozone attacks upon the neoprene-containing liner 12' of air spring 1'. The guard chamber formed can easily be dismantled to remove and replace the cellulose sponge 17 when cellulose sponge 17 becomes fully reacted with ozone. This embodiment of the invention can be incorporated either into the original design of the air spring or it may be added to a conventional air spring at any time after manufactured.

While a cellulose-containing material is the material illustrated as being the reactant with ozone in this invention, other materials will serve equally as well. Examples of materials which can be substituted for the cellulose-containing material are materials containing cotton waste or phenylnaphthol amine.

The foregoing detailed description of the preferred embodiments and the descriptions of some of the possible modifications of this invention have been given for clearness of understanding only, and no unnecessary limitations should be construed therefrom as other modifications will be obvious to those skilled in the art.

I claim as my invention:

1. In combination with a rubber-walled air spring suitable for use in a vehicle suspension system, an ozone acceptor material associated with said spring and in fluid communication with the air enclosed in said spring, said ozone acceptor material being operative to preferentially accept ozone whereby interior chemical deterioration of the rubber wall of the air spring is suppressed.

2. The air spring of claim 1 further characterized in that said ozone acceptor material is a cellulose-containing structure.

3. The air spring of claim 2 further characterized in that the cellulose-containing structure is a cellulose mesh positioned around the inner wall of the air spring.

4. The air spring of claim 2 further characterized in that the cellulose-containing structure is a cellulose sponge positioned within the air spring.

5. In combination with a rubber-walled air spring suitable for use in a vehicle suspension system, including an air supply means and a conduit connecting the air spring with said air supply means, a cellulose-containing material positioned in said conduit in fluid communication with the air within said conduit, said cellulose-containing material being operative to preferentially accept ozone whereby interior chemical deterioration of the rubber wall of the air spring is suppressed.

6. The air spring of claim 5 further characterized in that said cellulose-containing material is a cellulose mesh.

7. The improvement of claim 5 further characterized in that said cellulose-containing material is a cellulose sponge.